United States Patent [19]

Tsukutani et al.

[11] Patent Number: 4,578,623

[45] Date of Patent: Mar. 25, 1986

[54] BURN-OUT PREVENTIVE CIRCUIT FOR COMMUTATORLESS MOTOR

[75] Inventors: Seiichi Tsukutani, Sakaiminato; Naoki Nakada, Tottori, both of Japan

[73] Assignee: Matsishita Electric Industrial Co., Osaka, Japan

[21] Appl. No.: 612,643

[22] Filed: May 21, 1984

[30] Foreign Application Priority Data

May 26, 1983 [JP] Japan .................................. 58-92720

[51] Int. Cl.[4] .............................................. H02P 6/02
[52] U.S. Cl. .................................... 318/254; 318/138; 318/439
[58] Field of Search ................... 318/138, 254 A, 254, 318/439, 563

[56] References Cited

U.S. PATENT DOCUMENTS 4,030,005 6/1977 Doemen .............................. 318/138
4,169,990 10/1979 Lerdman ........................ 318/254 X

FOREIGN PATENT DOCUMENTS 55-120386 9/1980 Japan .................................. 318/138
58-108990 6/1983 Japan .................................. 318/254

Primary Examiner—William M. Shoop, Jr.
Assistant Examiner—Ro Bentsu
Attorney, Agent, or Firm—Spencer & Frank

[57] ABSTRACT

A burn-out preventive circuit for a commutatorless motor comprises drive windings of two phases, driving power transistors connected in series with the drive windings respectively, a position detecting element detecting the angular position of rotation of a permanent magnet rotor for alternately turning on the driving power transistors, and a protective circuit detecting a counter-electromotive force induced in the drive windings during rotation of the permanent magnet rotor for interrupting energization of the drive windings when the detected counter-electromotive force is lower than a predetermined level or zero.

10 Claims, 2 Drawing Figures

BURN-OUT PREVENTIVE CIRCUIT FOR COMMUTATORLESS MOTOR

BACKGROUND OF THE INVENTION

1. Field of the Invention

This invention relates to a commutatorless motor of the half-wave driven type provided with switching means that is on-off controlled depending on the angular position of rotation of a permanent magnet rotor, and more particularly to a burn-out preventive circuit for use in such a commutatorless motor for limiting the supply of a large current to the drive windings of the motor when the rotor is locked against rotation, thereby preventing burn-out of the drive windings.

2. Description of the Prior Art

As one of the prior art methods for preventing burn-out of the drive windings of a commutatorless motor when its rotor is locked against rotation due to an externally imparted force, a current limiting method is most frequently employed and commonly known which utilizes the fact that heat is generated from the drive windings or from a thermistor due to a large current appearing in the event of locking of the rotor. However, the prior art method utilizing the generated heat for preventing burn-out of the drive windings of the motor has had the problem of a slow response. Also, such a preventive device has been difficult to design especially when the motor is of the heavy-loaded type since the value of current in a locked condition does not appreciably change from that supplied under normal operation.

SUMMARY OF THE INVENTION

With a view toward overcoming these prior art problems, it is a primary object of the present invention to provide a burn-out preventive circuit which operates quickly and reliably to prevent burn-out of the drive windings when used in a commutatorless motor.

The present invention is featured by the fact that a counter-electromotive force induced in the drive windings of a commutatorless motor is detected to prevent burn-out of the drive windings in the event of locking of the rotor against rotation. That is, in the case of the drive windings of a commutatorless motor of the half-wave driven type, there is a time region in which no current is supplied thereto during rotation of the motor. In this time region, a counter-electromotive force is induced in the drive windings under the influence of the magnet of the permanent magnet rotor. However, such a counter-electromotive force is not induced in that one of the drive windings which is not under energization, when the motor is locked against rotation due to an externally imparted force. It is the burn-out preventive circuit of the present invention which discriminates the presence or absence of such a counter-electromotive force thereby limiting the current supplied to the drive windings of the motor.

DESCRIPTION OF THE PREFERRED EMBODIMENTS

Figure 1:
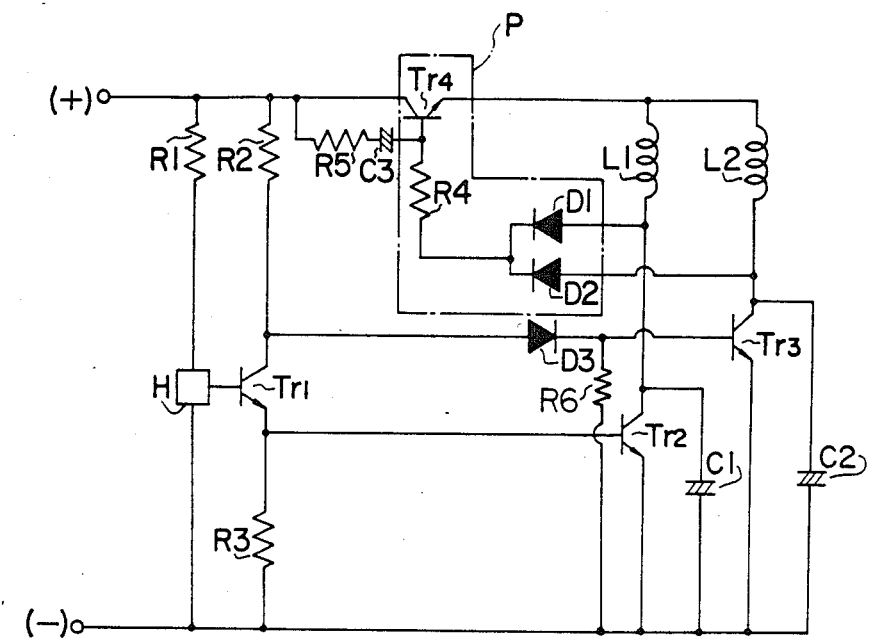
FIG. 1 is a circuit diagram of an embodiment of the burn-out preventive circuit of the present invention applied to a commutatorless motor.

A preferred embodiment of the present invention will now be described in detail with reference to FIG. 1. Referring to FIG. 1, two-phase drive windings $L_1$ and $L_2$ constitute part of a stator of a commutatorless motor of the half-wave driven type and are disposed opposite to a permanent magnet rotor (not shown). Position detecting means H such as a Hall element or a Hall IC is connected across power supply terminals through a resistor $R_1$. This position detecting means H is disposed at a position at which it is magnetically coupled to the permanent magnet rotor to detect the angular position of rotation of the permanent magnet rotor, and a rotation position signal of high or low level is generated from its output terminal depending on the angular position of rotation of the permanent magnet rotor. A transistor $T_{r1}$ is connected at its collector to the positive power supply terminal through a resistor $R_2$, at its emitter to the negative power supply terminal through a resistor $R_3$ and at its base to the output terminal of the position detecting means H. Driving power transistors $T_{r2}$ and $T_{r3}$ constitute switching means for switching over the current supplied to the drive windings $L_1$ and $L_2$. The transistor $T_{r2}$ is connected at its collector to the positive power supply terminal side through the drive winding $L_1$, at its emitter to the negative power supply terminal and at its base to the emitter of the transistor $T_{r1}$. The transistor $T_{r3}$ is connected at its collector to the positive power supply terminal side through the drive winding $L_2$, at its emitter to the negative power supply terminal and at its base to the collector of the transistor $T_{r1}$ through a diode $D_3$. Protective means P detects the counter-electromotive force induced in the drive windings $L_1$ and $L_2$ and acts to interrupt the current supplied to the drive windings $L_1$ and $L_2$ when the detected counter-electromotive force is lower than a predetermined level or zero. This protective means P includes a power transistor $T_{r4}$ connected at its collector to the positive power supply terminal and at its emitter to the drive windings $L_1$ and $L_2$, a pair of diodes $D_1$ and $D_2$ connected at their anodes to the negative power supply terminal side of the drive windings $L_1$ and $L_2$ respectively, and a resistor $R_4$ connected between the base of the power transistor $T_{r4}$ and the cathodes of the diodes $D_1$ and $D_2$. Capacitors $C_1$ and $C_2$ are connected in parallel with the collector and emitter of the driving power transistors $T_{r2}$ and $T_{r3}$ respectively to suppress a spike voltage generated in the drive windings $L_1$ and $L_2$ during switching of the transistor $T_{r2}$ or $T_{r3}$. The diode $D_3$ is connected at its anode to the connection point of the resistor $R_2$ and the collector of the transistor $T_{r1}$ and at its cathode to the connection point of the resistor $R_6$ and the base of the driving power transistor $T_{r3}$ for preventing turning-on of the driving power transistor $T_{r3}$ when the transistor $T_{r1}$ is turned on. A series circuit of a resistor $R_5$ and a capacitor $C_3$ is connected between the base and the collector of the power transistor $T_{r4}$. This series circuit acts as a starting compensation circuit which maintains the power transistor $T_{r4}$ in its on state until a counter-electromotive force is induced in the drive winding which is not energized at the time of starting the motor.

In the burn-out preventive circuit having the structure above described, the diode $D_1$ or $D_2$ selects the voltage of the driving power transistor $T_{r2}$ or $T_{r3}$ associated with the drive winding $L_1$ or $L_2$ which is not low energized, and such a voltage is applied to the base of the transistor $T_{r4}$. When now the output of high level appears from the output terminal of the position detecting means H, the transistor $T_{r1}$ is turned on, and current is supplied to the base of the driving power transistor $T_{r2}$ to energize the drive winding $L_1$. At this time, a counter-electromotive force is induced in the drive winding $L_2$, which is not energized now, to apply a bias voltage to the base of the power transistor $T_{r4}$ through the diode $D_2$ and resistor $R_4$, so that the base voltage of the transistor $T_{r4}$ becomes higher than the emitter voltage to maintain the transistor $T_{r4}$ in its on state. At this time, the resistor $R_4$ acts to regulate the base current of the transistor $T_{r4}$.

Then, when the output of the position detecting means H turns into its low level, the transistor $T_{r1}$ is turned off, and base current is supplied to the driving power transistor $T_{r3}$ through the resistor $R_2$ and diode $D_3$ to energize the drive winding $L_2$. A counter-electromotive force is similarly induced in the other drive winding $L_1$ to apply a bias voltage to the base of the power transistor $T_{r4}$ through the diode $D_1$ and resistor $R_4$, so that the transistor $T_{r4}$ is maintained in its on state. Thereafter, the drive windings $L_1$ and $L_2$ are alternately energized in the manner above described, thereby causing rotation of the permanent magnet rotor.

Suppose then that the permanent magnet rotor is locked against rotation when, for example, the drive winding $L_1$ is being energized. In such an event, no counter-electromotive force is induced in the other drive winding $L_2$ which is not energized, and a bias voltage is not applied to the base of the transistor $T_{r4}$. Consequently, the transistor $T_{r4}$ is turned off, and no current is supplied to the drive winding $L_1$ thereby preventing burn-out of the drive winding $L_1$. According to this burn-out preventive circuit, release of the permanent magnet rotor from the locked condition would not re-start the motor unless the power supply voltage is applied again. However, when a resistor of the large power consuming type is connected between the collector and the emitter of the transistor $T_{r4}$, manipulation for re-application of the power supply voltage for re-starting the motor is unnecessary, and the resistor $R_5$ and capacitor $C_3$ are also unnecessary.

Figure 2:
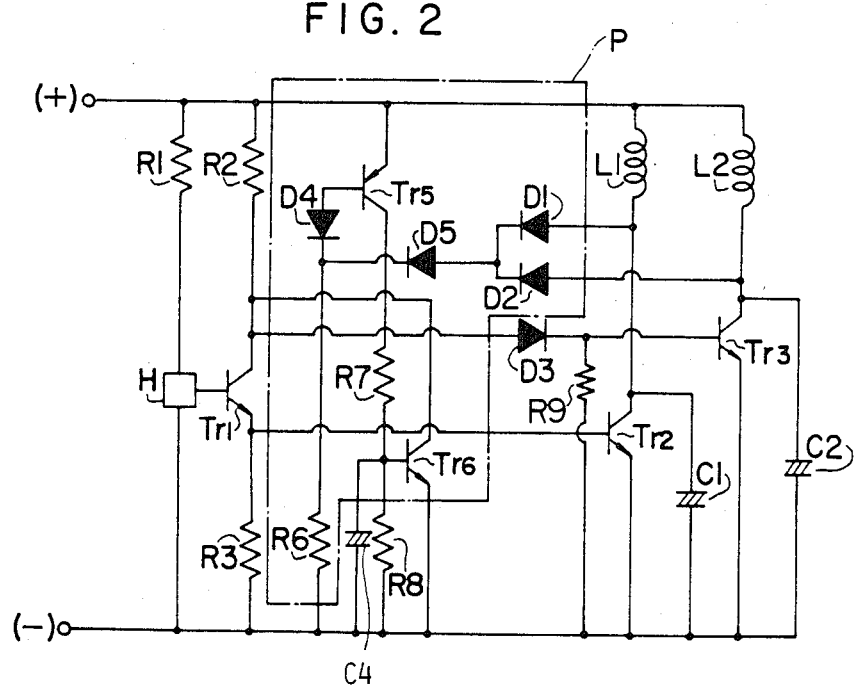
FIG. 2 is a circuit diagram of another embodiment of the present invention.

FIG. 2 shows another embodiment of the present invention or a modification of the embodiment shown in FIG. 1. In FIG. 2, the protective means P includes diodes $D_1$, $D_2$, $D_4$, $D_5$, small signal transistors $T_{r5}$, $T_{r6}$, and resistors $R_6$, $R_7$.

Referring to FIG. 2, the transistor $T_{r5}$ is connected at its emitter to the positive power supply terminal, at its base to the negative power supply terminal through the diode $D_4$ and resistor $R_6$, and at its collector to the base of the transistor $T_{r6}$ through the resistor $R_7$. The transistor $T_{r6}$ is connected at its collector to the connection point of the resistor $R_2$ and the collector of the transistor $T_{r1}$ and at its emitter to the negative power supply terminal. The diode $D_5$ is connected at its anode to the cathodes of the diodes $D_1$, $D_2$ and at its cathode to the connection point of the diode $D_4$ and the resistor $R_6$. The diode $D_4$ is disposed in the same polarity as that of the diodes $D_1$ and $D_2$ so that the base voltage of the transistor $T_{r5}$ may not exceed the emitter voltage thereby destroying the transistor $T_{r5}$. Further, this diode $D_5$ is provided for the purpose of attaining a voltage balance in the arrangement in which the diode $D_4$ is coupled to the base of the transistor $T_{r5}$. The resistor $R_6$ is provided for regulating the base current of the transistor $T_{r5}$.

In FIG. 2, a capacitor $C_4$ connected to the base of the transistor $T_{r6}$ and a resistor $R_8$ providing the discharge circuit of the capacitor $C_4$ constitute a starting compensation circuit which prevents the transistor $T_{r6}$ from being turned on by base current supplied to the transistor $T_{r6}$ through the transistor $T_{r5}$ and resistor $R_7$, until a counter-electromotive force is induced in the drive winding which is not energized at the time of starting the motor. More precisely, at the motor starting time, the transistor $T_{r5}$ is turned on, and base current tends to be supplied to the transistor $T_{r6}$. At this time, however, charge current is supplied to the capacitor $C_4$ to maintain the transistor $T_{r6}$ in its off state. Thus, the drive windings $L_1$ and $L_2$ are alternately energized depending on the level of the output of the position detecting means H thereby causing rotation of the permanent magnet rotor. When the rotor is placed under rotation, the counter-electromotive force is induced in the drive winding $L_1$ or $L_2$, and the transistor $T_{r5}$ is turned off for the reason described later thereby inhibiting the transistor $T_{r6}$ from being turned on. The voltage charged in the capacitor $C_4$ is discharged through the resistor $R_8$ when the transistor $T_{r5}$ is turned off.

The operation of the circuit shown in FIG. 2 will now be described. Suppose now that the output of the position detecting means H is in its high level. Then, the transistor $T_{r1}$ is turned on, and the driving power transistor $T_{r2}$ is turned on to energize the drive winding $L_1$. A counter-electromotive force is induced in the non-energized drive winding $L_2$ to apply a reverse bias voltage to the base of the transistor $T_{r5}$ through the diodes $D_2$ and $D_5$, so that the transistors $T_{r5}$ and $T_{r6}$ are maintained in their off state. Then, when the output of the position detecting means H turns into its low level, the transistor $Tr_1$ is turned off, and base current is supplied to the power transistor $Tr_3$ through the resistor $R_2$ and diode $D_3$, thereby turning on the transistor $Tr_3$ to energize the drive winding $L_2$. At this time, a counter-electromotive force is similarly induced in the other drive winding $L_1$ to apply a reverse bias voltage to the base of the transistor $T_{r5}$ through the diodes $D_1$ and $D_5$, thereby maintaining the transistors $T_{r5}$ and $T_{r6}$ in their off state. Thereafter, repetition of similar operation alternately energizes the drive windings $L_1$ and $L_2$ to cause rotation of the permanent magnet rotor.

Suppose that the permanent magnet rotor is locked against rotation while, for example, the drive winding $L_1$ is being energized. In such a case, no counter-electromotive force is induced in the other drive winding $L_2$ which is not energized now, and no reverse bias voltage is applied to the transistor $Tr_5$. Consequently, the voltage drop due to the resistance included in the drive winding $L_1$ and across the diodes $D_1$ and $D_5$ becomes larger than that across the base-emitter circuit of the transistor $Tr_5$ and across the diode $D_4$, and the base potential of the transistor $Tr_5$ is lowered to turn on the transistor $Tr_5$. Consequently, charging current is supplied through the resistor $R_7$ to the capacitor $C_4$ until the capacitor $C_4$ is completely charged. The transistor $Tr_6$ is now turned on, and current flows now to the transistor $Tr_6$ through the resistor $R_2$, so that no current flows through the transistor $Tr_1$. Consequently, the power transistor $Tr_2$ is turned off to interrupt the current supplied to the drive winding $L_1$ thereby preventing burn-out of the drive winding $L_1$ due to the continuous energization. Such a protective operation takes place similarly when the permanent magnet rotor is locked against rotation during energization of the drive winding $L_2$.

It will be apparent from the foregoing detailed description that, according to the present invention, a counter-electromotive force induced in the drive windings of a commutatorless motor is detected to control energization of the drive windings, so that objectionable burn-out of the drive windings in the event of locking of the motor can be reliably prevented by the protective means which operates at a very high response speed.

We claim:

1. A burn-out preventive circuit for a commutatorless motor comprising half-wave driven drive windings of two phases, driving power transistors connected in series with said drive windings respectively, position detecting means connected at its output terminal to the bases of said driving power transistors directly or indirectly for alternately turning on said driving power transistors depending on the angular position of rotation of a permanent magnet rotor, a power transistor constituting part of protective means connected in series with said drive windings, and diodes connected at their anodes to the negative power supply terminal side of said drive windings and at their cathodes to the base of said power transistor through a resistor, said power transistor being turned off when the counter-electromotive force induced in the non-energized one of said drive windings while the other is being energized is lower than the predetermined level or zero, thereby interrupting energization of said latter drive winding.

2. A burn-out preventive circuit as claimed in claim 1, wherein a starting compensation circuit is connected between the collector and the base of said power transistor to maintain said power transistor in its on state until the counter-electromotive force is induced in one of said drive windings which is not energized at the time of starting the motor.

3. A burn-out preventive circuit as claimed in claim 2, wherein said starting compensation circuit includes a series circuit of a resistor and a capacitor.

4. A burn-out preventive circuit for a commutatorless motor comprising half-wave driven drive windings of two phases, driving power transistors connected in series with said drive windings respectively, a first transistor connected in parallel with the series circuits of said drive windings and said driving power transistors and connected at its base to the cathodes of diodes connected at their anodes to the negative power supply terminal side of said drive windings respectively, said first transistor being turned off when the counter-electromotive force is induced in the non-energized one of said drive windings while the other is being energized, but turned on when the induced counter-electromotive force is lower than the predetermined level or zero, position detecting means connected at its output terminal to the bases of said driving power transistors directly or indirectly for alternately turning on said driving power transistors depending on the angular position of rotation of a permanent magnet rotor, and a second transistor having its base connected to the collector of said first transistor and its collector connected to said position detecting means, said second transistor being turned on when said first transistor is turned on thereby interrupting the current supplied to the base of said driving power transistor connected in series with the energized one of said drive windings, so that said specific driving power transistor is turned off to interrupt energization of said specific drive winding.

5. A burn-out preventive circuit as claimed in claim 4, wherein a starting compensation circuit is connected between the collector and the base of said second transistor to maintain said second transistor in its off state until the counter-electromotive force is induced in one of said drive windings which is not energized at the time of starting the motor.

6. A burn-out preventive circuit as claimed in claim 5, wherein said starting compensation circuit includes a series circuit of a resistor and a capacitor.

7. A burn-out preventive circuit for a commutatorless motor comprising drive windings of at least two phases, switching means connected in series with said drive windings respectively, position detecting means detecting the position of a permanent magnet rotor for alternately turning on said switching means, and protective means detecting a counter-electromotive force induced in said drive windings during rotation of said permanent magnet rotor for interrupting energization of said drive windings when the detected counter-electromotive force is lower than a predetermined level or zero, said protective means including a power transistor connected in series with said drive windings, diodes connected at their anodes to the negative power supply terminal side of said drive windings respectively, and a resistor connected between the base of said power transistor and the cathodes of said diodes, said power transistor being turned off when the counter-electromotive force induced in the non-energized one of said drive windings while the other is being energized is lower than the predetermined level of zero, thereby interrupting energization of said latter drive winding.

8. A burn-out preventive circuit as claimed in claim 7, wherein said position detecting means includes a Hall element or a Hall IC.

9. A burn-out preventive circuit for a commutatorless motor comprising drive windings of at least two phases, switching means connected in series with said drive windings respectively, position detecting means detecting the position of a permanent magnet rotor for alternately turning on said switching means, and protective means detecting a counter-electromotive force induced in said drive windings during rotation of said permanent magnet rotor for interrupting energization of said drive windings when the detected counter-electromotive force is lower than a predetermined level or zero, said protective means including diodes connected at their anodes to the negative power supply terminal side of said drive windings respectively, a first transistor connected at its base to the cathodes of said diodes, said first transistor being turned off when the counter-electromotive force is induced in the non-energized one of said drive windings while the other is being energized, but turned on when the induced counter-electromotive force is lower than the predetermined level or zero, and a second transistor having its base connected to the collector of said first transistor and its collector connected to said position detecting means, said second transistor being turned on when said first transistor is turned on thereby decreasing or interrupting the current supplied to the base of said switching means connected in series with the energized one of said drive windings.

10. A burn-out preventive circuit as claimed in claim 9, wherein said position detecting means includes a Hall element or a Hall IC.

* * * * *

UNITED STATES PATENT AND TRADEMARK OFFICE
CERTIFICATE OF CORRECTION

PATENT NO. : 4,578,623
DATED : March 25th, 1986
INVENTOR(S) : TSUKUTANI ET AL.

It is certified that error appears in the above—identified patent and that said Letters Patent is hereby corrected as shown below:

Please correct line [73] to read as follows:

-- Assignee: Matsushita Electric Industrial Co., Ltd. --
Osaka, Japan

Signed and Sealed this

Second Day of September 1986

[SEAL]

Attest:

DONALD J. QUIGG

Attesting Officer

Commissioner of Patents and Trademarks